Aug. 9, 1938.　　E. S. DENNISON　　2,126,313
FLEXIBLE COUPLING
Filed July 23, 1937　　6 Sheets-Sheet 1

Inventor:
Edward S. Dennison
By: Brown, Jackson, Boettcher & Dienner
Attys.

Aug. 9, 1938.   E. S. DENNISON   2,126,313
FLEXIBLE COUPLING
Filed July 23, 1937   6 Sheets-Sheet 2
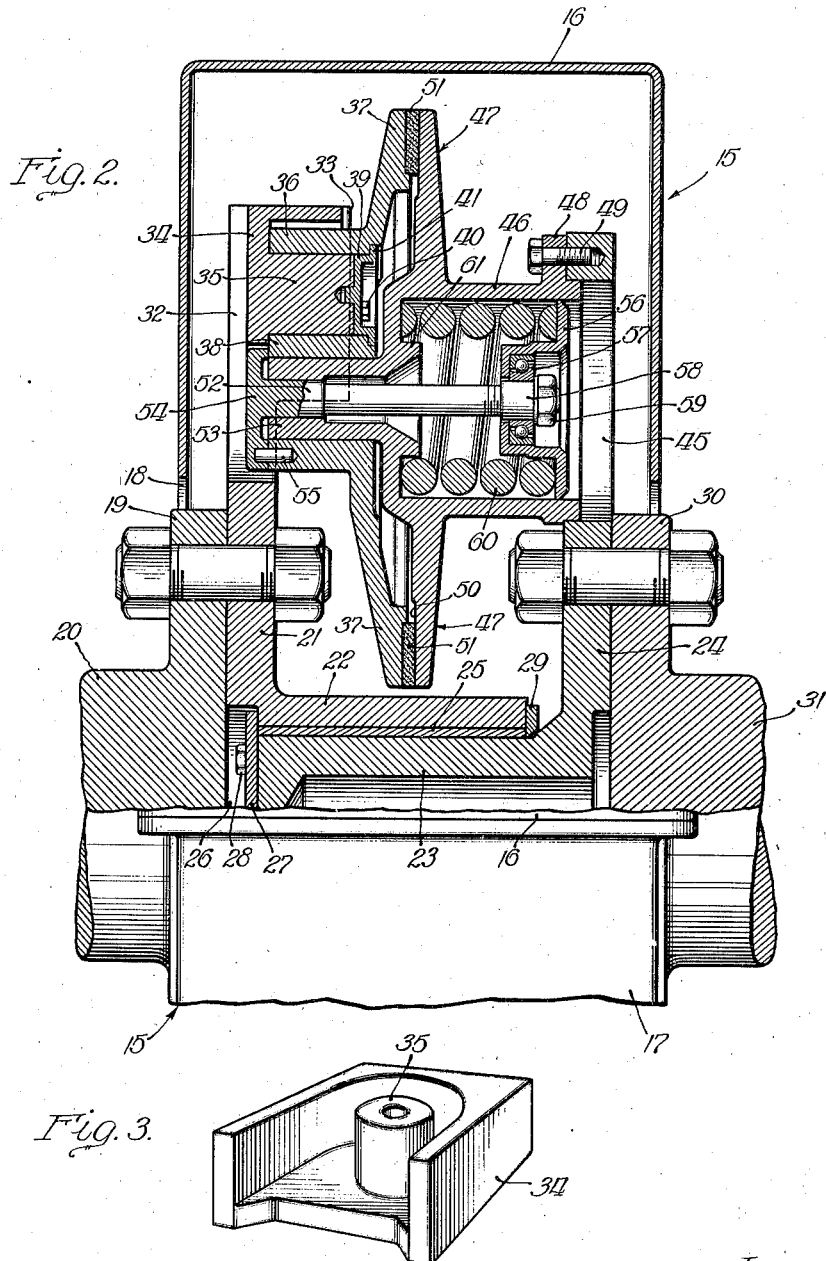
Inventor.
Edward S. Dennison
By: Brown, Jackson, Bottcher & Dienner
Attys.

Aug. 9, 1938.   E. S. DENNISON   2,126,313
FLEXIBLE COUPLING
Filed July 23, 1937   6 Sheets-Sheet 3

Inventor:
Edward S. Dennison
By: Brown, Jackson, Boettcher & Dienner
Attys.

Aug. 9, 1938. E. S. DENNISON 2,126,313
FLEXIBLE COUPLING
Filed July 23, 1937  6 Sheets-Sheet 4

Inventor:
Edward S. Dennison
By: Brown, Jackson, Crettcher & Ochsner
Attys.

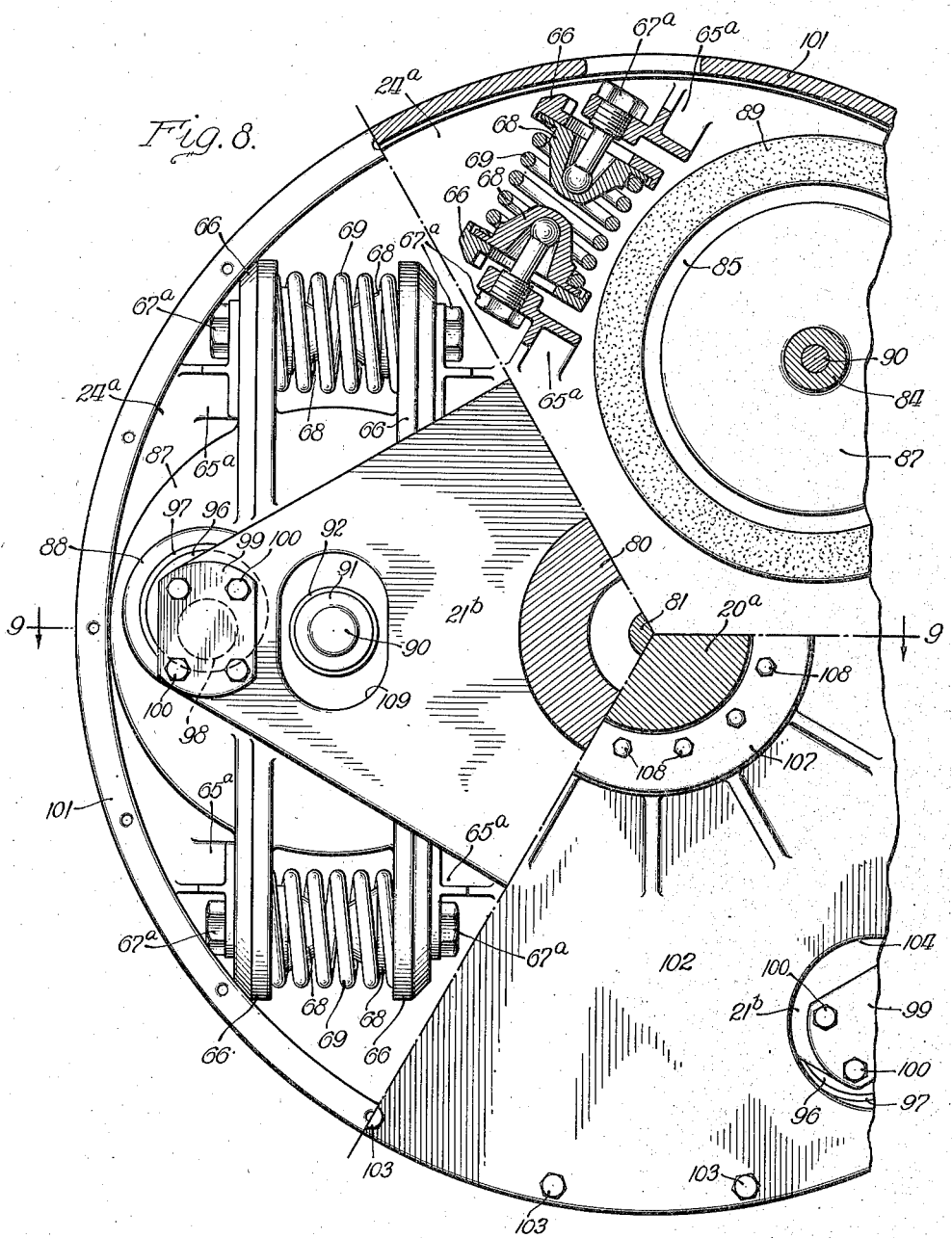

Aug. 9, 1938.   E. S. DENNISON   2,126,313
FLEXIBLE COUPLING
Filed July 23, 1937   6 Sheets-Sheet 6

Inventor:
Edward S. Dennison

Patented Aug. 9, 1938

2,126,313

UNITED STATES PATENT OFFICE 2,126,313

FLEXIBLE COUPLING

Edward S. Dennison, New London, Conn.

Application July 23, 1937, Serial No. 155,229

17 Claims. (Cl. 64—27)

This invention relates to flexible couplings, and has to do with couplings suitable for connecting the shaft of a Diesel engine to the shaft of a driven machine or apparatus, and for protecting the systems including such couplings against objectionable torsional vibration.

The coupling of my invention is of the spring type and comprises friction means effective to damp out objectionable vibration due to torsional oscillation. My invention is directed to the provision of means for transmitting the torque of the drive member of the coupling to the driven member thereof, such means comprising friction damping means and associated transmission springs, the latter being subjected to but slight normal deflection and the static friction of the damping means being sufficient to transmit the drive to the driven member, when the imposed torque is within a predetermined maximum value, the springs being deflected beyond normal driving extent, accompanied by simultaneous slippage of the damping means to exert a damping effect, when the imposed torque exceeds or tends to exceed the predetermined maximum value. A further object is to provide transmission means of the character stated comprising members acting upon the springs to transmit torque therethrough, such members being connected to the drive member of the coupling so as to be subjected to relatively great angular movement responsive to turning of the drive member relative to the driven member, thus magnifying the relative turning movement of the former and thereby greatly decreasing the magnitude of the forces and moments to be dealt with by the transmission means, whereby the elements of the latter may be of convenient and practicable sizes. Further objects and advantages will appear from the detailed description.

In the drawings:—

Figure 2 is a sectional view, on an enlarged scale, taken substantially on line 2—2 of Figure 1, the lower portion of this view being shown in side elevation, certain parts of the sectional portion of this view being shown in elevation;

Figure 3 is a detail perspective view, on an enlarged scale, of one of the connecting blocks;

Figure 10:
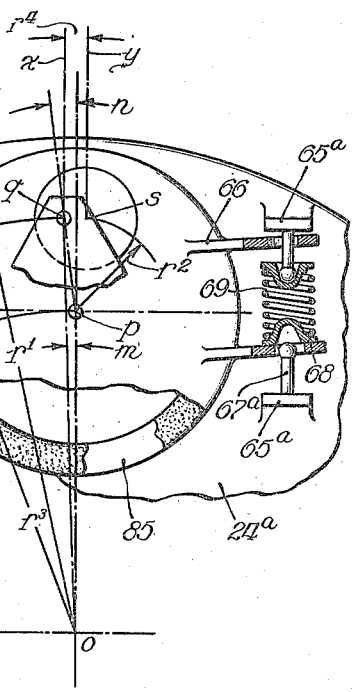
Figure 9:
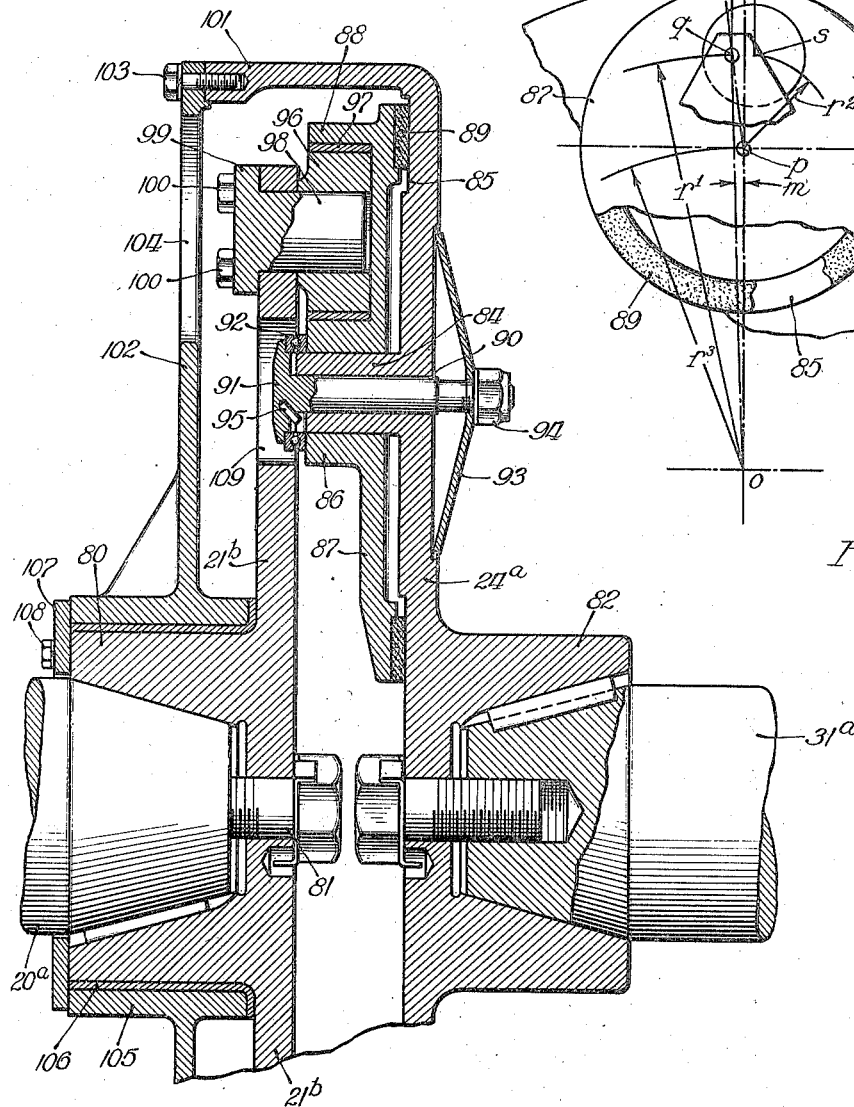

Figure 8 is a front view of a second modified form of coupling embodying my invention, one area being shown in elevation, a sector of one section of the housing being omitted in a second area and the corresponding portion of the coupling being shown in elevation, the housing and the coupling being shown in section in a third area, in which certain parts are shown in elevation, the housing and coupling being in part broken away;

Figure 9 is a sectional view taken substantially on line 9—9 of Figure 8, on an enlarged scale, certain parts being shown in elevation;

Figure 10 is a diagrammatic view of the damping means and associated transmission springs and related elements, parts being broken away and parts being shown in section, of the coupling shown in Figure 8.

In the form of my invention illustrated in Figures 1 to 6, inclusive, the coupling proper is enclosed within a housing 15 of appropriate form and construction, comprising upper and lower sections 16 and 17, respectively, having cooperating bolting flanges for securing them together. Housing 15 is provided, through the front wall thereof, with a concentric opening 18 which accommodates flange 19 of a shaft 20 which, for purposes of description, may be designated the drive shaft and, in practice, may be a crank shaft of a Diesel engine or a shaft suitably driven from a Diesel engine or other suitable prime mover. Flange 19 is suitably secured, as by bolting, to a spider 21 constituting the drive member of the coupling. Spider 21 is provided with a rearwardly projecting tubular hub 22 coaxial with shaft 20. Hub 22 receives stud 23 of a second spider 24, constituting the driven member of the coupling, there being a bushing 25 interposed between hub 22 and stud 23. Hub 22 is provided, at its outer portion, with a bore 26 of increased diameter relative to the bore of the remainder of hub 22, providing a shoulder with which cooperates a disc 27 suitably secured, as by means of set screws 28, to the end of stud 23, for confining spider 24 against movement away from spider 21. A ring 29, disposed about stud 23 and confined between a shoulder thereon and the inner end of hub 22, cooperates with the latter for confining spider 24 against axial movement toward spider 21. In this manner the spiders 21 and 24 are confined against relative axial movement, are rotatable about a common axis and are capable of relative turning movement. Spider 24 is suitably secured, as by bolting, to flange 30 of a driven shaft 31.

Figure 1:
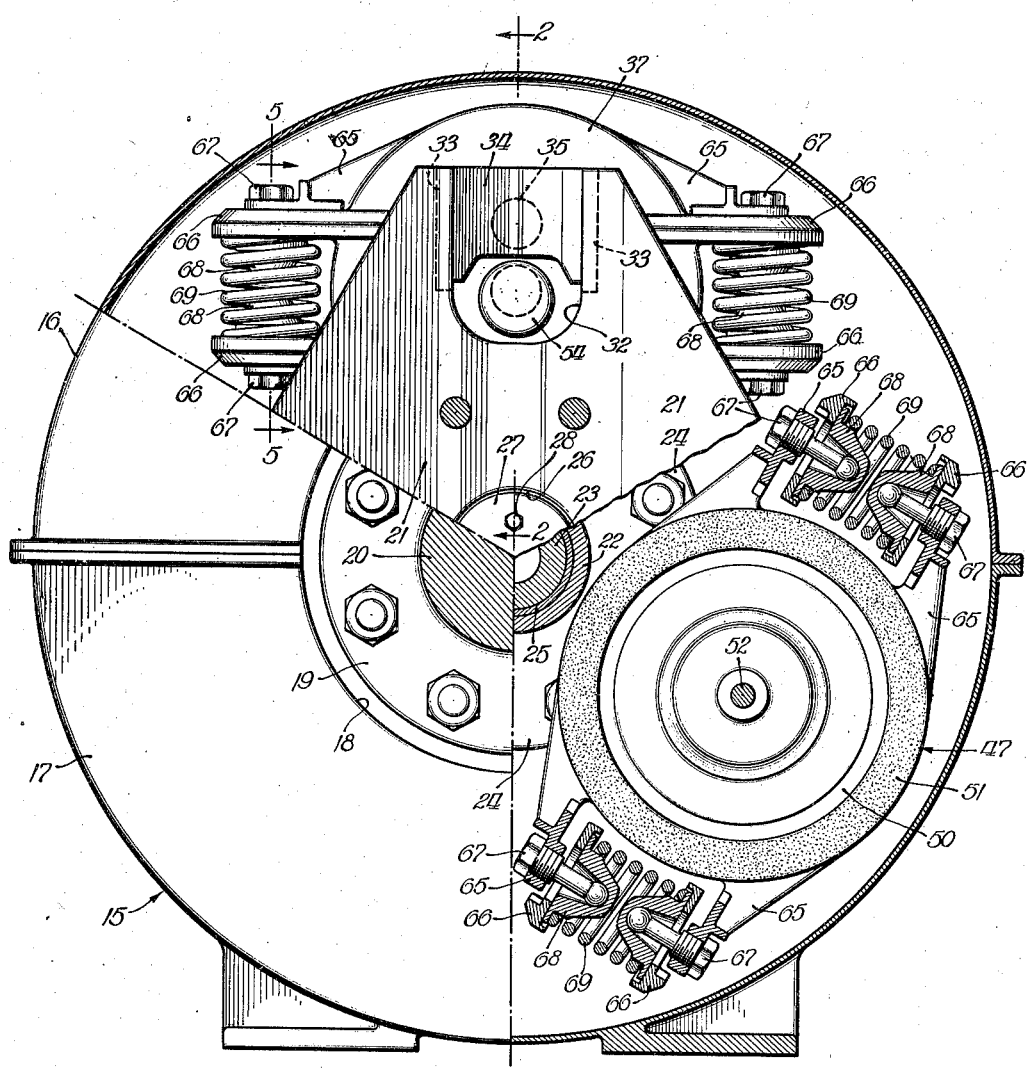
Figure 1 is a front view of the coupling embodying my invention, different areas thereof being sectioned in different planes and one area being shown in elevation, parts being broken away and certain parts being shown in elevation.
Figure 4:
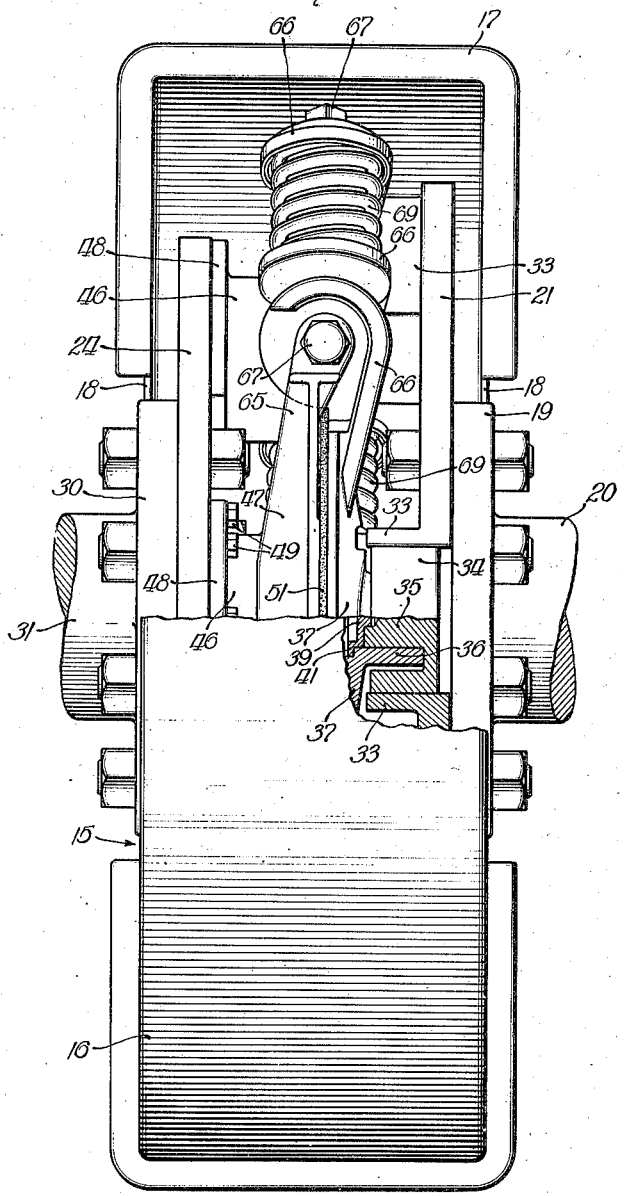
Figure 4 is a plan view, on an enlarged scale, of the coupling of Figure 1, partly broken away and partly in section.
Figure 5:
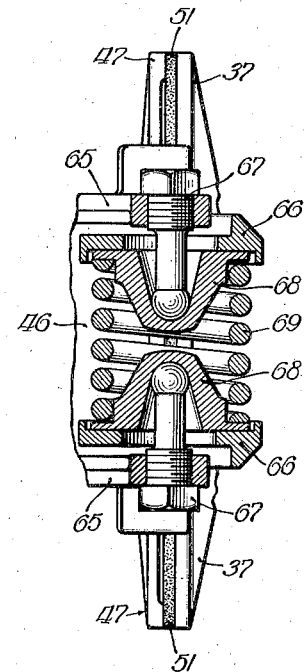
Figure 5 is a sectional view taken substantially on line 5—5 of Figure 1, on an enlarged scale, certain parts being shown in elevation.

Spider 21 is of approximately triangular shape, as will be clear from Figure 1, and each arm thereof is provided with a slot 32 extending from the outer end of the arm, the latter having inwardly projecting flanges 33 at each side of slot 32. A connecting block 34, formed as shown in Figure 3, is slidably mounted between flanges 33 and, in part, in slot 32. Block 34 is provided with an inwardly projecting pin 35 which fits into a sleeve 36 projecting from the outer face of a friction disc 37. Sleeve 36 is parallel to and, in part, integral with tubular hub 38 projecting from the outer face of disc 37 coaxially therewith. A cup-shaped retainer 39, fitting in the inner end of sleeve 36, is secured to the inner end of pin 35 by cap screws, one of which is shown at 40, this retainer being provided with an outwardly projecting flange 41 seating in a corresponding rabbet formed in the inner end of sleeve 36. In this manner block 34 is confined against movement relative to sleeve 36 axially of the latter, it being noted that the outer end of sleeve 36 contacts the inner face of the block.

Spider 24 is also of approximately triangular shape and is provided, in each arm thereof, with a circular opening 45, these openings being aligned with slots 32 of spider 21. Each opening 45 receives the outer end portion of tubular hub 46 of a second friction disc 47 disposed coaxially with disc 37 and cooperating therewith in a manner to be more fully explained hereinafter. Hub 46 is provided with an outwardly projecting flange 48 which is secured to spider 24 in a suitable manner, as by means of cap screws, one of which is shown at 49. In this manner disc 47 is secured to spider 24 rigid therewith, this disc being provided at its inner face with an annular friction surface 50 coacting with a ring 51 of suitable friction material mounted in any suitable known manner upon disc 37 at the inner face thereof.

A pivot bolt 52 passes through a tubular hub 53 projecting from the inner face of disc 47 through hub 38 of disc 37. Bolt 52 is provided, at its forward end with a flange head 54 the flange of which seats upon the forward end of hub 38 of disc 37, head 54 and hub 38 being confined against relative turning movement by a pin 55 extending into registering bores in hub 38 and the flange of head 54. The rearward portion of bolt 52 passes through a cup washer 56 disposed within the outer end portion of hub 46 of disc 47. A ball-bearing structure 57, of known type, seats in cup washer 56 and is confined between the forward end thereof and a flange at the rearward end of a collar 58 through which bolt 52 passes. A nut 59, screwing upon the rearward end of bolt 52, serves to hold the parts in assembled relation and also provides means for adjusting the tension of a compression spring 60 confined within hub 46 between cup washer 56 and the central portion of disc 47 at the forward end of hub 46, this spring seating at its forward end about an annular projection 61 integral with disc 47 and the forwardly projecting hub 53 thereof. In this manner disc 37 is mounted upon spider 24 for turning movement relative thereto about an axis eccentric to the common axis of rotation of spiders 21 and 24, while being confined against relative movement about the latter axis. Spring 60 and bolt 54 and associated parts yieldingly urge disc 37 toward disc 47 into friction contact therewith, through the medium of friction ring 51, and the pressure exerted upon disc 37 may readily be adjusted by means of nut 59 and bolt 52. The ball-bearing 57 permits of turning of disc 37 about the axis of bolt 52, relative to disc 47, under certain conditions and for a purpose to be described presently.

Disc 47 is provided with two pairs of arms 65 rigid therewith, these arms conveniently being formed integrally with the disc, which project beyond the periphery of the disc and are disposed in pairs at opposite sides of bolt 52. Each pair of arms 65 receives therebetween a pair of arms 66 rigid and preferably integral with disc 37, each arm 66 being spaced an appropriate distance from the associated arm 65. Ball ended bolts 67 are secured to the outer ends of arms 65 and seat in centering nipples 68 the base portions of which are flanged and seat in suitable recesses in the ends of arms 66. A compression spring 69 seats at its ends about nipples 68 and is confined between the base flanges thereof under appropriate tension. It will be noted (Figure 5) that the nipples 68 are spaced apart a distance sufficient to permit of considerable deflection or compressing of spring 69 without being brought into contact one with the other. Ordinarily, the nipples do not contact but, in the event of breakage of spring 69 they may come into contact, then functioning as stop members for maintaining driving connection between the parts of the coupling and limiting turning movement of disc 37 relative to disc 47.

The block 34, discs 37 and 47 and spring 69 and associated parts constitute a unit for establishing driving connection between the drive member 21 and the driven member 24 of the coupling. In practice I preferably provide a plurality of such units, there being three in the particular coupling illustrated by way of example. The number of units employed may be varied as desired and to suit conditions, as will be understood.

In assembling, the springs 69 are confined under appropriate tension and the tension of springs 69 is so adjusted that no appreciable deflection of springs 69 occurs and there is no slippage of disc 37 relative to disc 47, so long as the imposed torque is within a predetermined maximum value, spider 24 being then driven from spider 21 as a unit therewith through the friction connections established by the discs 37 and 47. In the event the imposed torque exceeds or tends to exceed this predetermined maximum value, resulting in turning of drive member 21 relative to driven member 24, the friction disc 37 will be turned through a much greater angle than that through which member 21 is turned relative to member 24, causing additional deflection or compression of springs 69, it being noted that this occurs simultaneously with slippage of disc 37 relative to disc 47 so that a damping effect is produced which prevents the development of objectionable torsional vibration.

Figure 6:
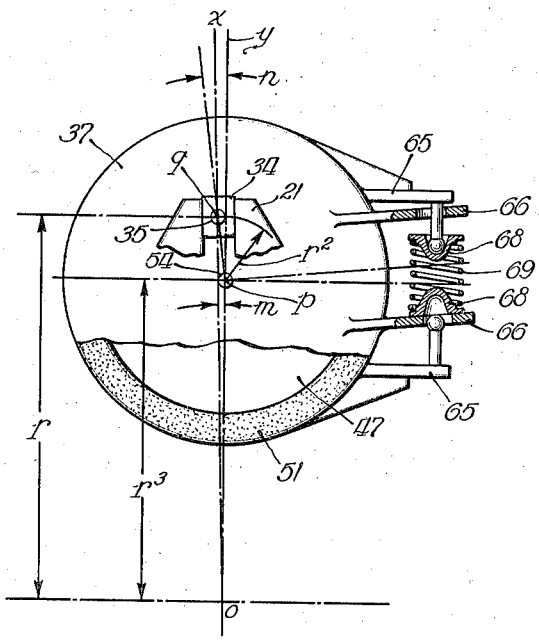
Figure 6 is a diagrammatic view, partly broken away and partly in section, with certain parts omitted, illustrating the operation of the damping means and associated springs and cooperating elements.

Referring to Figure 6, should a sufficiently large turning moment develop between the driving shaft and the driven shaft, spider 21 will be displaced with respect to spider 24. Let $ox$ be a radius of spider 21 passing through axis $q$ of pin 35 of block 34, and $oy$ a radius of spider 21 passing through the axis $p$ of disc 37 as displaced relative to spider 21, incident to turning thereof relative to spider 24. Then angle $xoy=m$ is the angular displacement between spiders 21 and 24. The corresponding angle $n$ through which the disc 37 is turned is larger than angle $m$. The ratio $n/m$ is the magnification factor. For any small displacement the factor is constant and is equal to $K=r/r^2$, in which $r$=arm $oq$ and $r^2=pq$, the center distance between bolt 52 and pin 35 of block 34. Rotation of disc 37 is resisted by damping friction and by the transmission spring 69, in the manner described. The total turning moment to be resisted by the springs and the damper friction is much less than the moment exerted in the shafting about the common axis of rotation thereof, being inversely proportional to the magnification factor $K$ as defined above. Factor $K$ may, for example, be equal to five.

Assuming that shaft 20 is the crank shaft of a Diesel engine, when the engine is started the disc 37 will normally be in its neutral or undisplaced position. The imposition of the engine torque, including irregularities due to varying crank positions during a revolution, will cause the disc 37 to move or turn with respect to disc 47. In order to do this, the moment due to the force acting at radius $r$ must be sufficient to overcome the static friction of the damper, and also to produce a further deflection in the driving or transmission springs 69. The disc 37 will slip in the driving direction until the resistance due to damper friction and spring load overcomes the imposed torque, and will then again come to rest. The amount of static friction is such that it exceeds the normal irregularities of torque, above and below the mean. Therefore, if the engine begins to operate, for example, at its full load torque, the damper will have shifted to a new position, in which further slippage does not occur. In this new position, the transmission springs will be under an increased load. Under such conditions, the torque transmitted will be irregular rather than constant, but its irregularities will be insufficient to cause damper slippage. The coupling is then in effect a rigid one.

As long as the coupling remains rigid, the engine shaft and reciprocating parts, together with the coupling and the generator, assuming shaft 31 to be a generator shaft, constitute an elastic system having one or more natural frequencies of torsional vibration. At some engine speeds resonance will occur between one of these frequencies and that of some harmonic force due to gas pressure acting in the engine cylinder. This is one of the critical speeds of the assembly. Should the engine run at such a speed, torsional vibration will begin to build up in the shaft. In the absence of any preventive, the amplitude of vibration may grow to large proportions such as to impose dangerous or destructive torsional stresses upon the shaft. This condition is the cause of shaft breakage and the purpose of the coupling is to prevent its occurrence.

The coupling is so placed in the elastic system that should torsional vibration develop, the maximum oscillatory torque which it produces will occur at or near the locality of the coupling itself. This torque, to be dangerous, must ordinarily exceed by several times the value of the normal power torque. But before such a torque can build up, the dampers will have been caused to slip in the manner already described. As soon as such slippage occurs, two distinct effects are produced, both of which act to reduce the vibration to negligible dimension. Firstly, the slippage of the damper directly absorbs the energy of the vibration, so that it is to a large extent eliminated directly. Secondly, as soon as the dampers slip, the character of the elastic system is radically changed. The original system is replaced by one which includes the elasticity of the transmission springs. The frequency of this new system is much lower than that of the original one. Also, by suitable choice of springs, it can easily be provided that critical speeds in the two systems do not coincide. Therefore, as long as slippage continues, no resonance will exist. In any case, any vibration of the second system is accompanied by heavy damping. Due to this combination of effects, damper slippage will stop very soon after it begins, and the vibration will have been reduced to safe proportions. The same cycle will then be repeated.

It is evident from the foregoing that the dampers will not slip continuously, even when the engine is running at a critical speed. The cycle of events is as follows: Vibration is built up without slippage of the damper, slippage of the dampers occur with the results that existing vibration is eliminated, and the parts come to rest and vibration starts to build up again. The fact that slight and intermittent slippage is enough to prevent building up critical vibration contributes to long life and dependability of the coupling. The amplitude of slippage necessary to prevent vibration is not sufficient to cause contact between the spring stops or nipples 68, and these nipples act only in case of breakage or like emergency, as above stated.

As soon as the engine passes out of the critical speed range, the dampers cease to slip, since they are able to resist torque fluctuations in the absence of resonance. In this manner, the elastic and damping characteristics of the couplings are held in reserve and function only as needed to overcome dangerous conditions otherwise encountered at critical running speed. This is conducive to long life of the coupling since it avoids unnecessary relative movement of the parts thereof. Since each of the discs 37 and 47 is provided with two pairs of arms, with a torsion spring 69 confined between each pair of arms 66, it will be apparent that upon turning of disc 37 counterclockwise the lower arm 66 at the right hand side of this disc, as viewed in Figure 6, will be raised, movement of the spring being prevented by bolt 67 and nipple 68 associated with upper arm 65 of disc 47. This results in increased deflection or compression of spring 69. In like manner spring 69 at the left hand side of the disc 37 will be subjected to increased compression between the upper arm 66 at this side of the disc and bolt 67 and nipple 68 associated with lower arm 65 at the left hand side of disc 47. It will be apparent, therefore, that the coupling functions in the manner above described when the spider 21 is driven in either direction, being equally efficient in either case.

Figure 7:
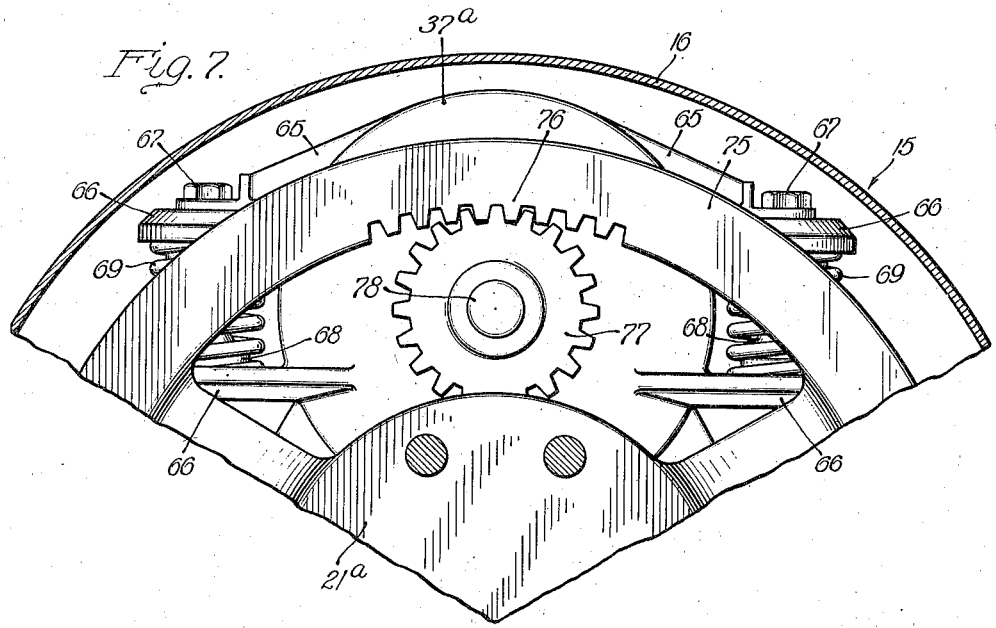
Figure 7 is a fragmentary front view of a modified form of coupling embodying my invention, the coupling housing being shown fragmentarily and in section.

In the modified form illustrated in Figure 7 I provide a multiple armed spider 21$a$, which may be considered as the drive member, carrying an inwardly offset annulus 75 provided with gear tooth rack segments, one of which is shown at 76. Segment 76 meshes with a spur pinion 77 secured upon a stub shaft 78 suitably secured to disc 37a coaxially therewith. The rack segment 76 and pinion 77 provide connections between spider 21a and disc 37a for imparting to the latter relatively great turning movement responsive to turning of spider 21a relative to spider 24. In other respects the construction and operation of the form of coupling of Figure 7 are the same as in the coupling of Figures 1 to 6, inclusive, and need not be illustrated nor described in greater detail.

In the form of coupling shown in Figures 8 to 10, inclusive, spider 21b, which may be considered as the drive member of the coupling, is of approximately triangular shape and is provided with an outwardly projecting central hub 80 taper bored for reception of the tapered end portion of shaft 20a, keyed in hub 80 and secured to spider 21b by a bolt 81 passing through the spider and screwing into the shaft. Driven spider 24a is provided with an outwardly projecting hub 82 taper bored for reception of the tapered end portion of shaft 31a secured in hub 82 in the same manner in which shaft 21a is secured in hub 80 of spider 21b. Spider 24a is provided with three inwardly projecting sleeves, one of which is shown at 84 and has, upon its inner face, an annular friction surface 85 concentric with each sleeve 84. The latter fits through hub 86 of friction disc 87, which is provided, adjacent hub 86 and in part integral therewith, with a sleeve 88 eccentric to hub 86. A ring 89 of suitable friction material is mounted upon disc 87 and coacts with the latter and with surface 85 of spider 24a for exerting a friction braking or damping effect.

A pivot bolt 90 passes through sleeve 84 and is provided, at its forward end, with an enlarged head 91, between which and the forward end of hub 86 is confined a ball-bearing structure 92 of known type. Bolt 90 passes through a disc spring 93 seating at its periphery against the outer face of spider 24a and placed under compression by a nut 94 screwing upon the rearward end of the bolt. In this manner disc 87 is yieldingly urged toward friction surface 85 and the pressure exerted for this purpose may be adjusted at any desired predetermined value, within limits. The ball-bearing structure 92 permits of turning of disc 87 about sleeve 84, under certain conditions, it being noted that bolt 90 is confined against turning movement in sleeve 84 by means of a pin 95 inserted in head 91 and projecting into a slot in the sleeve.

A collar 96, provided with an eccentric bore, fits into sleeve 88 with an intervening bushing 97. This collar 96 receives a pin 98 provided, at its forward end, with an enlarged head 99 secured in a suitable manner, conveniently by means of cap screws 100, to spider 21b. Spider 24a is provided with a forwardly projecting circumferential flange 101, of considerable width, defining with the spider a housing for enclosing the parts of the coupling. A cover plate 102 is suitably secured to the forward edge of flange 101, as by means of cap screws 103. Plate 102 is provided with openings, one of which is shown at 104, disposed in alignment with head 99 of the respective pins 98 for ready access thereto. The cover plate 102 is further provided with a central collar 105 which accommodates hub 80 of spider 21a, with an intervening flanged bushing 106. The inner flanged end of bushing 106 is confined between spider 21b and the inner end of collar 105, and a retaining ring 107 is secured to the outer end of hub 80 in a suitable manner, conveniently by cap screws 108, and projects across the outer end of bushing 106 and the outer end of collar 105. Spider 21b is provided, in each arm thereof, with an elongated opening 109 which receives head 91 of bolt 90, and, in part, ball-bearing structure 92, accommodating turning of spider 21b relative to spider 24a while giving access to bolt 90 and associated parts for assembling and disassembling these parts and like purposes.

It will be noted that pin 98 is connected to disc 87 eccentrically thereof and is also eccentric to the associated collar 96. Upon turning movement of spider 21b relative to spider 24a disc 87 will be turned about the axis of bolt 90 through a relatively great angle, as in Figures 1 to 6, inclusive, although the operation will be slightly different, as will be explained presently.

Each disc 87 is provided with two pairs of arms 66 rigid therewith and at opposite sides thereof, as Figure 1. The arms 66 at each side of disc 87 extends between two lugs 65a projecting from the inner face of spider 24a and rigid therewith, these lugs 65a conveniently being formed integrally with spider 24a. A compression spring 69 seats at its ends about flanged centering thimbles 68 which receive ball ended bolts 67a anchored in lugs 65a and extending through openings in the arms 66. Under normal operating conditions the springs 69 are not subjected to appreciable deflection and driving connection from spider 21b to spider 24a is provided by the static friction between disc 27a and cooperating surfaces 85 of spider 24a. If spider 21a turns relative to spider 24a, due to the imposed torque exceeding the predetermined maximum value, slippage of disc 87 occurs accompanied by simultaneous additional deflection or compression of the springs 69 and the damping action, previously described, effective for preventing objection ably high torsional vibration and resulting increase in imposed torque.

Referring to Figure 10, it is assumed in this figure that spider 21b has been turned counter-clockwise relative to spider 24a with resulting relatively great turning movement of disc 87 in counterclockwise direction. Under the conditions assumed, the two spiders are relatively offset by the angle $m$, and the disc 87 has been rotated through the much greater angle $n$. The magnification factor $K=n/m$ is given substantially by $K=r^1/(r^1-r^3)$, and is practically unaffected by radius $r^2$ from the axis of disc 87 to the axis of the sleeve 88. The eccentric collar 96 acts as a link of length $r^4$, acting in tension or compression. This link rotates very slightly when a displacement occurs. The length of $r^4$ has no perceptible effect on K, but it should be sufficient to obviate binding of the eccentric collar 96 in sleeve 88. In Figure 8 the axis of pin 98 is shown as normally being on the same radius of spider 21b as the axis of disc 87. This is not essential. If desired, referring to Figure 10, the radius $pq$ may make an angle of 30°, for example, with radius $op$ extended, in the normal positions of the parts. This would result in an increase of $r^2$, which might be desirable in view of space considerations. This offset location of the eccentric collar 96 is not illustrated but will be understood from the above. Since K is determined by $r^1$ and $r^3$, as above pointed out, it is practically unaffected by offsetting the eccentric collar 96 in the manner referred to. In any case the direction of the center line $qs$ should be substantially tangent to a circle of radius $r^1$.

In the preceding description I have referred to one of the members of the coupling as a drive member and the other member as a driven member, for convenience. In practice, either member or spider of the coupling may be the drive member, and the coupling will function to transmit rotation thereof in either direction and to prevent objectionable torque load being built up by oscillatory vibration or other causes, in the manner above set forth.

As above indicated, and as will be understood by those skilled in the art, changes in construction and arrangement of parts of my invention may be resorted to, without departing from the field and scope of the same, and I intend to include all such variations, as fall within the appended claims, in this application in which the preferred forms only of my invention are disclosed.

I claim:—

1. In coupling means of the character described, a drive member and a driven member rotatable about a common axis and capable of relative turning movement, friction damping means comprising friction elements connected to said driven member for driving the latter and friction members cooperating with said elements turnable relative thereto about axes eccentric to said common axis, connections between said drive member and said friction members effective for turning the latter through a relatively great angle upon turning of said drive member relative to said driven member, spring means resisting turning of said friction members, and means adjustable independently of said spring means yieldingly urging said friction members toward said friction elements.

2. In coupling means of the character described, a drive member and a driven member rotatable about a common axis and capable of relative turning movement, friction damping means comprising friction elements rigid with said driven member and friction members cooperating with said elements turnable relative thereto about axes eccentric to said common axis, connections between said drive member and said friction members effective for turning the latter through a relatively great angle upon turning of said drive member relative to said driven member, and springs interposed between the respective friction elements and friction members presenting increasing resistance to relative turning of the latter.

3. In coupling means of the character described, a drive member and a driven member rotatable about a common axis and capable of relative turning movement, transmission members mounted on said driven member turnable relative thereto about axes eccentric to said common axis and confined against turning about said latter axis relative to said driven member, connections between said drive member and said transmission members effective for turning the latter through a relatively great angle responsive to turning of said drive member relative to said driven member, yielding connections between said driven member and said transmission members presenting increasing resistance to relative turning of the latter, and friction damping means supplementary to said transmission members and yielding connections for establishing driving connection between said drive member and said driven member.

4. In coupling means of the character described, a drive member and a driven member rotatable about a common axis and capable of relative turning movement, transmission members mounted on said driven member turnable relative thereto about axes eccentric to said common axis and confined against turning about said latter axis relative to said driven member, connections between said drive member and said transmission members effective for turning the latter through a relatively great angle responsive to turning of said drive member relative to said driven member, yielding connections between said driven member and said transmission members presenting increasing resistance to relative turning of the latter, and solid friction damping means supplementary to said transmission members and yielding connections for establishing driving connections between said drive member and said driven member.

5. In coupping means of the character described, a drive member and a driven member rotatable about a common axis and capable of relative turning movement, transmission members mounted on said driven member turnable relative thereto about axes eccentric to said common axis and confined against turning about said latter axis relative to said driven member, connections between said drive member and said transmission members effective for turning the latter through a relatively great angle responsive to turning of said drive member relative to said driven member, yielding connections between said driven member and said transmission members presenting increasing resistance to relative turning of the latter, and solid friction damping means supplementary to said transmission members and yielding connections for establishing driving connections between said drive member and said driven member, the static friction of said damping means being of a value normally to provide driving connection between said drive and driven members, said yielding connections becoming operative only when said static friction is overcome due to fluctuations of the imposed driving torque.

6. In coupling means of the character described, a drive member and a driven member rotatable about a common axis and capable of relative turning movement, transmission members mounted on said driven member turnable relative thereto about axes eccentric to said common axis and confined against turning about said latter axis relative to said driven member, connections between said drive member and said transmission members effective for turning the latter through a relatively great angle responsive to turning of said drive member relative to said driven member, yielding connections between said driven member and said transmission members presenting increasing resistance to relative turning of the latter, and solid friction damping means supplementary to said transmission members and yielding connections for establishing driving connections between said drive member and said driven member, the static friction torque of said damping means exceeding the normal non-resonant fluctuations of the transmitted torque.

7. In coupling means of the character described, a drive member and a driven member rotatable about a common axis and capable of relative turning movement, transmission members mounted on said driven member turnable relative thereto about axes eccentric to said common axis and confined against turning about said latter axis relative to said driven member, connections between said drive member and said transmission members effective for turning the latter through a relatively great angle responsive to turning of said drive member relative to said driven member, yielding connections between said driven member and said transmission members presenting increasing resistance to relative turning of the latter, and solid friction damping means supplementary to said transmission members and yielding connections for establishing driving connections between said drive member and said driven member, the static friction torque of said damping means being substantially equal to the mean value of the transmitted torque.

8. In coupling means of the character described, a drive member and a driven member rotatable about a common axis and capable of relative turning movement, said driven member having friction surfaces rigid therewith, friction members cooperating with said surfaces mounted on said driven member turnable relative thereto about axes eccentric to said common axis and confined against turning relative to said driven member about said common axis, transmission springs interposed between said driven member and said friction members presenting increasing resistance to relative turning of the latter, and connections between said drive member and said friction members effective for turning the latter through a relatively great angle responsive to turning of said drive member relative to said driven member.

9. In coupling means of the character described, a drive member and a driven member rotatable about a common axis and capable of relative turning movement, said driven member having friction surfaces rigid therewith, friction members cooperating with said surfaces mounted on said driven member turnable relative thereto about axes eccentric to said common axis and confined against turning relative to said driven member about said common axis, transmission springs interposed between said driven member and said friction members presenting increasing resistance to relative turning of the latter, connections between said drive member and said friction members effective for turning the latter through a relatively great angle responsive to turning of said drive member relative to said driven member, and means adjustable independently of said springs yieldingly urging said friction members toward said friction surfaces.

10. In coupling means of the character described, a drive member and a driven member rotatable about a common axis and capable of relative turning movement, said driven member having annular friction surfaces rigid therewith eccentric to said common axis, friction discs mounted on said driven member cooperating with said surfaces yieldingly urged toward the latter and turnable about the axes thereof, transmission springs interposed between said driven member and said discs presenting increasing resistance to turning of the latter about said axes, and connections between said drive member and said discs eccentric to the latter effective for turning said discs through a relatively great angle responsive to turning of said drive member relative to said driven member.

11. In coupling means of the character described, a drive member and a driven member rotatable about a common axis and capable of relative turning movement, friction discs fixed to said driven member eccentric to said common axis, friction discs mounted on said driven member turnable about the axis of and cooperating with said fixed discs, transmission springs connecting said fixed discs to said turnable discs presenting increasing resistance to turning of the latter, means holding said turnable discs in contact with said fixed discs under predetermined pressure, and connections between said drive member and said turnable discs eccentric to the latter effective for turning said turnable discs through a relatively great angle responsive to turning of said drive member relative to said driven member.

12. In coupling means of the character described, a drive member and a driven member rotatable about a common axis and capable of relative turning movement, friction discs fixed to said driven member eccentric to said common axis each provided at opposite sides thereof with a pair of spaced arms, friction discs mounted on said driven member turnable about the axes of and cooperating with said fixed discs, each of said turnable discs having at opposite sides thereof a pair of spaced arms disposed between and spaced from the arms of the associated fixed disc, compression springs between the respective pairs of arms of said turnable discs, cooperating means carried by the arms of said discs effective for compressing said springs responsive to turning of said turnable discs, connections between said drive member and said turnable discs eccentric to the latter effective for turning them through a relatively greater angle responsive to turning of said drive member relative to turning of said driven member, and adjustable yielding means holding said turnable discs in contact with said fixed discs.

13. In coupling means of the character described, a drive member and a driven member rotatable about a common axis and capable of relative turning movement, friction discs fixed to said driven member eccentric to said common axis each provided at opposite sides thereof with a pair of spaced arms, friction discs mounted on said driven member turnable about the axes of and cooperating with said fixed discs, each of said turnable discs having at opposite sides thereof a pair of spaced arms disposed between and spaced from the arms of the associated fixed disc, compression springs between the respective pairs of arms of said turnable discs, cooperating means carried by the arms of said discs effective for compressing said springs responsive to turning of said turnable discs, said drive member having radial slots therein, connecting blocks slidable in said slots and pivoted to said turnable discs eccentric thereto, and means holding said turnable discs in contact with said fixed discs under predetermined pressure.

14. In coupling means of the character described, a drive member and a driven member rotatable about a common axis and capable of relative turning movement, friction discs fixed to said driven member eccentric to said common axis each provided at opposite sides thereof with a pair of spaced arms, friction discs mounted on said driven member turnable about the axes of and cooperating with said fixed discs, each of said turnable discs having at opposite sides thereof a pair of spaced arms disposed between and spaced from the arms of the associated fixed disc, compression springs between the respective pairs of arms of said turnable discs, cooperating means carried by the arms of said discs effective for compressing said springs responsive to turning of said turnable discs, gear and pinion connections between said drive member and said turnable discs effective for turning the latter through a relatively great angle responsive to turning of said drive member relative to said driven member, and means holding said turnable discs in contact with said fixed discs under predetermined pressure.

15. In coupling means of the character described, a drive member and a driven member rotatable about a common axis and capable of relative turning movement, said driven member having annular friction surfaces formed thereon eccentric to said axis and being provided at opposite sides of the respective friction surfaces with pairs of spaced abutments, friction discs mounted on said driven member cooperating with said surfaces yieldingly urged toward the latter and turnable about the axes thereof, each of said discs having at opposite sides thereof a pair of spaced arms disposed between and spaced from the abutments of the associated friction surface, compression springs between the respective pairs of arms of said turnable discs, cooperating means carried by said arms and abutments effective for compressing said springs responsive to turning of said discs, gear and pinion connections between said drive member and said discs effective for turning the latter through a relatively great angle responsive to turning of said drive member relative to said driven member, and means holding said turnable discs in contact with said fixed discs under predetermined pressure.

16. In coupling means of the character described, a drive member and a driven member rotatable about a common axis and capable of relative turning movement, and driving connections between said members comprising solid friction damping means and springs cooperating therewith, together effective for transmitting to said driven member the torque of said drive member without alteration beyond normal driving extent in deflection of said springs or slippage of said damping means, when the imposed torque is within a predetermined maximum value, the static friction of said damping means being of such value that slippage thereof occurs responsive to and simultaneously with increased deflection of said springs incident to increase of torque in excess of said predetermined maximum value.

17. In coupling means of the character described, a drive member and a driven member rotatable about a common axis and capable of relative turning movement, and driving connections between said members comprising solid friction damping means mounted on said driven member having friction driving connection thereto and transmission springs between said damping means and said drive member effective for transmitting torque of the latter to said damping means, said springs being in parallel relation to said damping means, the strength of said springs and the static friction of said damping means being such that normal deflection of said springs occurs without slippage of said damping means, when the imposed torque is within a predetermined maximum value, and slippage of said damping means occurs simultaneously with increased deflection of said springs incident to increase of torque in excess of said predetermined maximum value.

EDWARD S. DENNISON.